United States Patent [19]

Rehm

[11] Patent Number: 4,502,048

[45] Date of Patent: Feb. 26, 1985

[54] SECURITY MEANS

[76] Inventor: Werner J. Rehm, 22 Lomatta St., The Gap, Queensland, 4061, Australia

[21] Appl. No.: 324,388

[22] PCT Filed: Feb. 5, 1981

[86] PCT No.: PCT/AU81/00014

§ 371 Date: Nov. 13, 1981

§ 102(e) Date: Nov. 13, 1981

[87] PCT Pub. No.: WO81/02349

PCT Pub. Date: Aug. 20, 1981

[30] Foreign Application Priority Data

Feb. 15, 1980 [AU] Australia ............................ PE2391

[51] Int. Cl.[3] ........................ H04Q 9/00; E05B 49/00; G06F 3/02

[52] U.S. Cl. .......................... 340/825.31; 340/365 VL

[58] Field of Search .................... 340/825.31, 365 VL, 340/712; 364/410

[56] References Cited

U.S. PATENT DOCUMENTS

| | | | |
|---|---|---|---|
| 3,508,202 | 4/1970 | Joel, Jr. . | |
| 3,587,051 | 6/1971 | Hovey . | |
| 3,670,322 | 6/1972 | Mallebrein . | |
| 4,100,534 | 7/1978 | Shifflet, Jr. . | |
| 4,333,090 | 6/1982 | Hirsch | 340/365 VL |
| 4,369,973 | 1/1983 | D'Aurora et al. | 364/410 |
| 4,415,893 | 11/1983 | Rowland | 340/825.31 |

FOREIGN PATENT DOCUMENTS

| | | |
|---|---|---|
| 54-102844 | 8/1979 | Japan . |
| 54-102845 | 8/1979 | Japan . |
| 1165903 | 10/1969 | United Kingdom . |

OTHER PUBLICATIONS

IBM Technical Disclosure Bulletin, vol. 21, No. 2, Jul. 1978, "Programmable Key/Display/Switch Device", S. E. Bigbie et al., pp. 442-444.

*Primary Examiner*—Donald J. Yusko

*Attorney, Agent, or Firm*—Schwartz, Jeffery, Schwaab, Mack, Blumenthal & Koch

[57] ABSTRACT

A security device having a keyboard with an array of selectively actuable keys which are activated to generate an output code according to a value designated for each of the keys. A series of display units, such as LED's or liquid crystals, display the designated value for each of the keys. Between successive operations of the keyboard, the designated values for each of the keys are randomly scrambled. Each time the keys are actuated, the designated values of the keys are sequentially registered and the sequential values compared to a predetermined access code to determine if the successively actuated values correspond to the predetermined access code.

12 Claims, 10 Drawing Figures

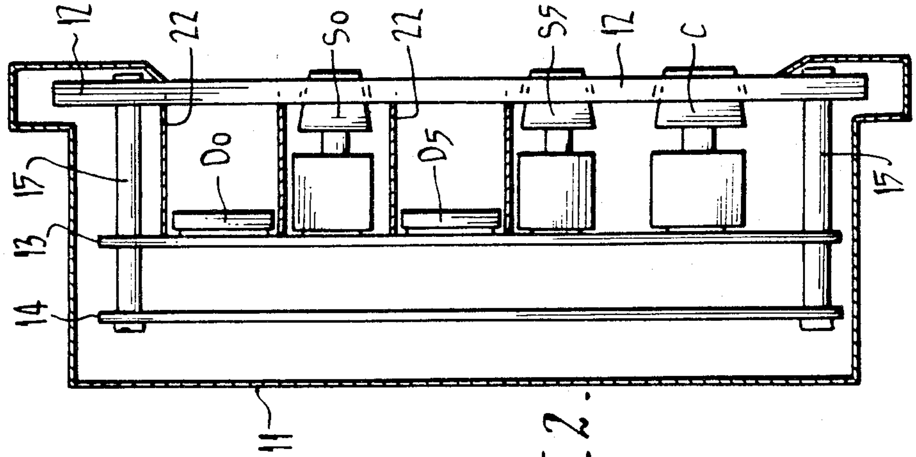
FIG. 2.
FIG. 1
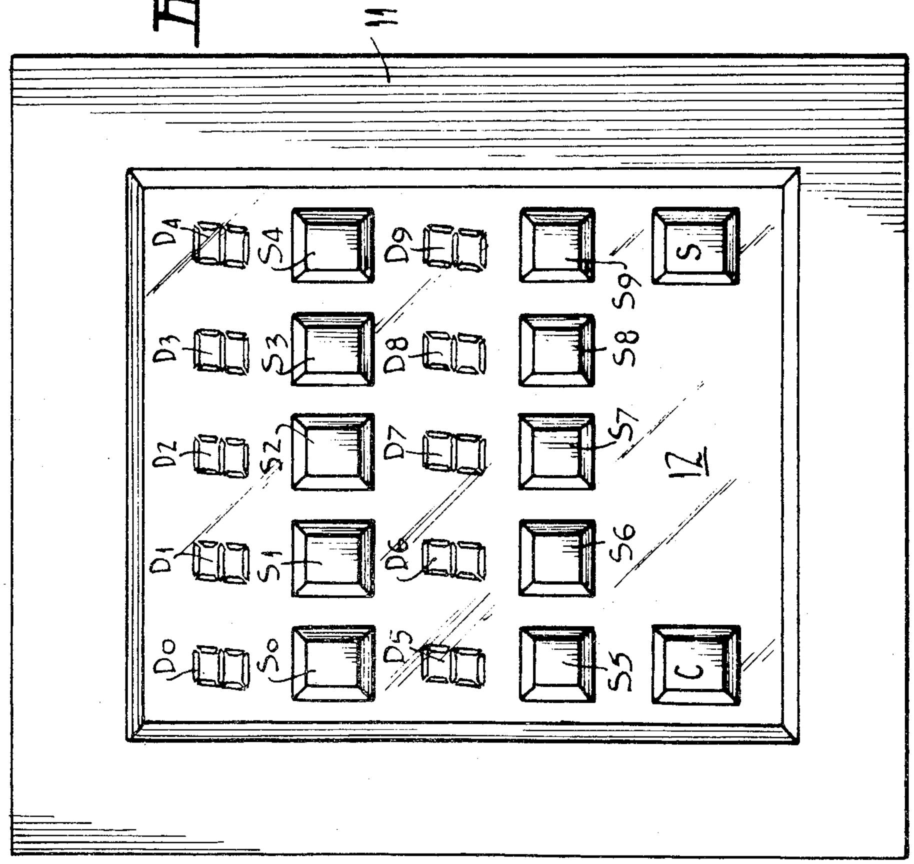

SECURITY MEANS

This invention relates generally to security systems. More particularly, it relates to access control systems which may be used for controlling access to, for example, safes, strong rooms, buildings, security areas in buildings, computer terminals and electronically stored information such as credit records, just to mention a few of the applications where security is required.

Many types of access control systems have been devised over the years from the earliest forms of key operated locks, to the sophistication of combination locks and the relatively recent advent of electronically coded card keys and readers. None of these systems has been particularly satisfactory, however, since more and more sophisticated procedures have been developed to defeat them. Keys can be duplicated, combinations can be broken by trial and error or detected by observation of an authorized person opening the combination controlled lock and electronically coded card keys can be forged.

It has previously been proposed to provide an access control system incorporating a manually actuable keyboard, the keys of which are selectively actuable to generate a code which, if correct, will provide the necessary access. This system has the advantage that there is no key or card which can be lost, stolen or forged but conventional keyboard systems suffer a similar disadvantage to combination locks in that it is possible for an observer to note the combination of keys actuated by an authorized person. The present invention provides an improved keyboard security apparatus by which this problem is overcome.

DISCLOSURE OF INVENTION

According to the invention there is provided security apparatus comprising a keyboard having an array of selectively actuable keys;

key value designation means to designate values to the keys and including designation scrambling means operative randomly to scramble the designation of key values;

key value display means to display the values designated to the keys by the key designation means; and register means to register for each key actuation the value designated to the respective key at the time of its actuation.

Preferably, the key value display means comprises a series of illuminating display units allotted one to each key and each operative to display an indicia representative of the value designated to the respective key by the key designation means.

The keys may be in the form of push-buttons and the display units may comprise light-emitting diode or liquid crystal displays located adjacent the respective buttons or carried by the buttons so as to display the indicia through the outer ends of the buttons.

In operation of the above described apparatus the random scrambling of the designated key values prevents an observer from detecting a correct code merely by noting the order in which particular keys are actuated since the position of the keys for the correct code will be changed.

In a simple access control system, access may be obtained solely by operation of the keyboard. In more sophisticated systems, however, additional security equipment may be included. For example, the system may also include a magnetic code reader which must receive a correctly coded instrument such as a key or card to enable the keyboard.

BRIEF DESCRIPTION OF DRAWINGS

In order that the invention may be more fully explained one particular embodiment will be described in some detail with reference to the accompanying drawings in which:

FIG. 1 is a plan view of a push-button keyboard apparatus constructed in accordance with the invention;

FIG. 2 is a side elevation of the apparatus shown in FIG. 1;

Figure 5:
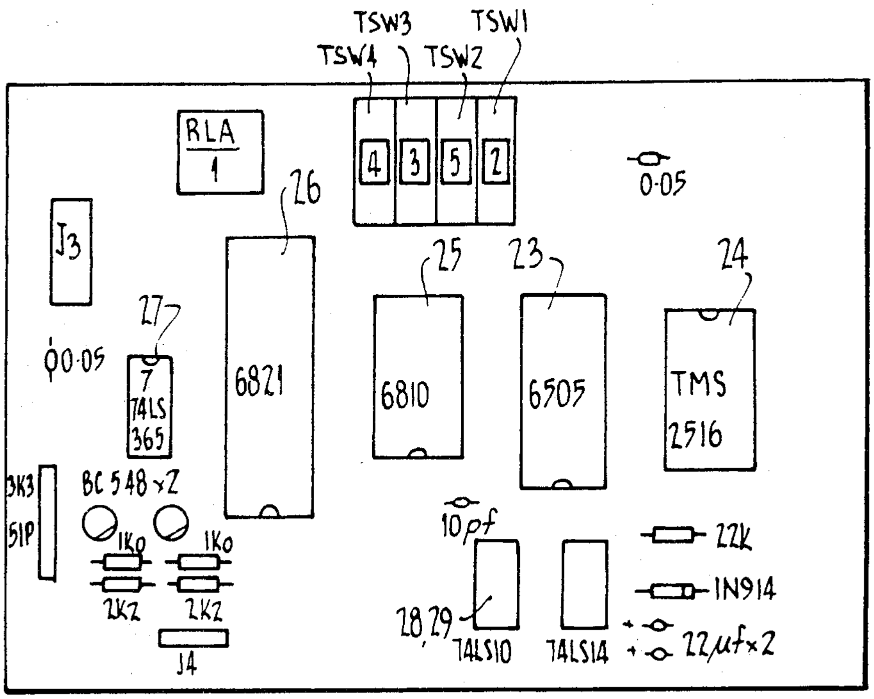
Figure 6:
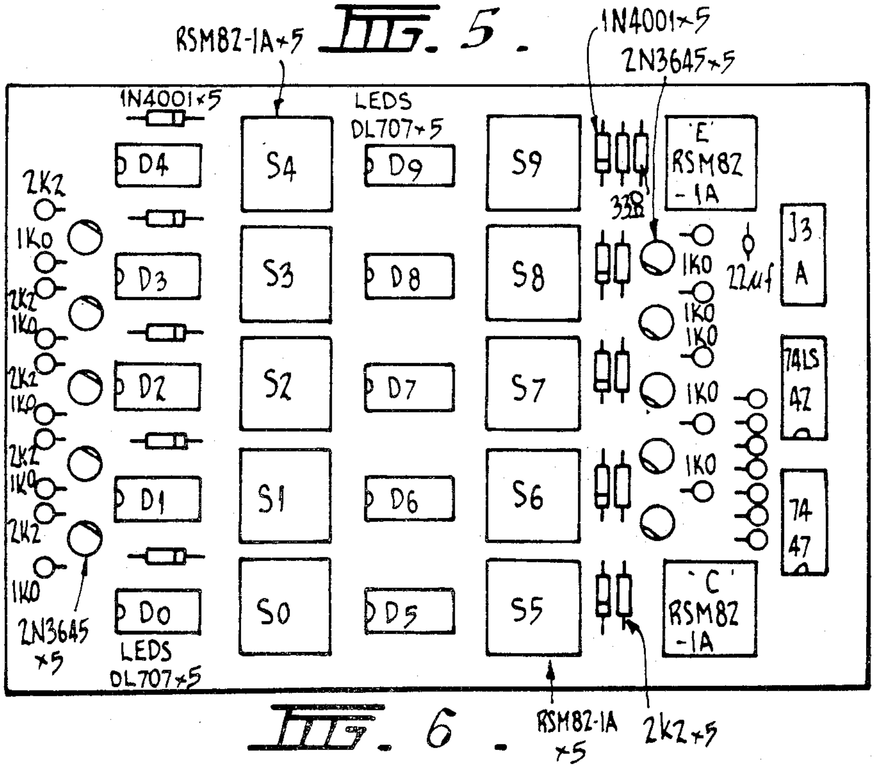

FIGS. *3a*, *3b* and 4 illustrate the electrical circuitry of the keyboard apparatus;

FIGS. 5 and 6 illustrate the manner in which the various electrical components of the apparatus may be mounted on a pair of circuit boards; and FIGS. *7a–c* is a flow chart detailing the operation of the apparatus.

BEST MODES OF CARRYING OUT THE INVENTION

With particular reference to FIGS. 1 and 2 the illustrated keyboard apparatus comprises an outer casing 11 fitted with a keyboard face plate 12. The electrical components of the keyboard are mounted on a pair of parallel printed circuit boards 13, 14 carried on posts 15 fixed to face plate 12 so as to extend within casing 11.

The circuit board 13 carries a series of ten unmarked push button switches $S_0$ to $S_9$ arranged in two rows having five switches each. The push buttons of these switches project through apertures in face plate 12 and are unmarked. Board 13 also carries two additional push-button switches marked respectively "C" and "S" (for "Clear" and "Start") and located beneath the two rows of unmarked push button switches $S_0$ to $S_9$.

Board 13 also carries a series of ten single digit numeric display units $D_0$ to $D_9$ disposed one above each of the push-button switches $S_0$ to $S_9$ and each housed within a tube 22 opening through an aperture in face plate 12. In operation of the keyboard, designations ascribed to the ten key switches $S_0$ to $S_9$ are displayed by the corresponding display units $D_0$ to $D_9$ and a person operating the keyboard must look straight down the tubes 22 to read the characters displayed.

Before turning to the electrical circuitry of the keyboard, its general mode of operation will be described. A person who wishes to operate the keyboard firstly presses the start button "S". This causes the electrical circuitry of the keyboard to generate a random sequence of the digits 0 to 9 and to display these on display units $D_0$ to $D_9$ in that random sequence.

The operator then actuates four of the key switches $S_0$ to $S_9$ in sequence and the keyboard circuitry operates to assemble a four digit number comprising the four digits displayed for the selected keys. The random sequence of digits is then cleared from the displays and the assembled number is displayed briefly using four of the digit displays only. After this brief confirmation display the four digit displays are extinguished and the assembled number is compared with a valid code number initially set within the system. If the number assembled by operation of the keyboard corresponds with the correct code number a relay is actuated. The relay can be made to operate any sort of external circuit to provide the access required. It may, for example, be connected into the circuit of an electrically operable door. At any time up to the end of the brief confirmation display the clear button "C" may be pressed if a mistake is made.

The keyboard makes use of a microprocessor based circuit providing the logic necessary to scan the key switches, multiplex the numeric displays, generate new random display sequences, and compare the number generated by the keyboard with a preset valid code number. The functions more precisely are as follows.

1. Random Sequence Generation

The microprocessor generates random sequences for display by a combination of a pure random number and a psuedo-random number generator routine within the programme of the microprocessor. The sequence thus generated is stored within the working memory ready for the display multiplexing routines.

2. Display Multiplex

When the keyboard is activated by actuation of the "S" key, the microprocessor displays digits in each of the numeric displays in the keyboard. The digit displayed in any position is determined by a random pattern stored in the working memory for the microprocessor.

3. Key Switch Scan

The microprocessor now "looks" continuously at the key switches waiting for a key depression. When a key is depressed the digit currently displayed in the associated display is stored in the working memory for the microprocessor.

Figure 3A:
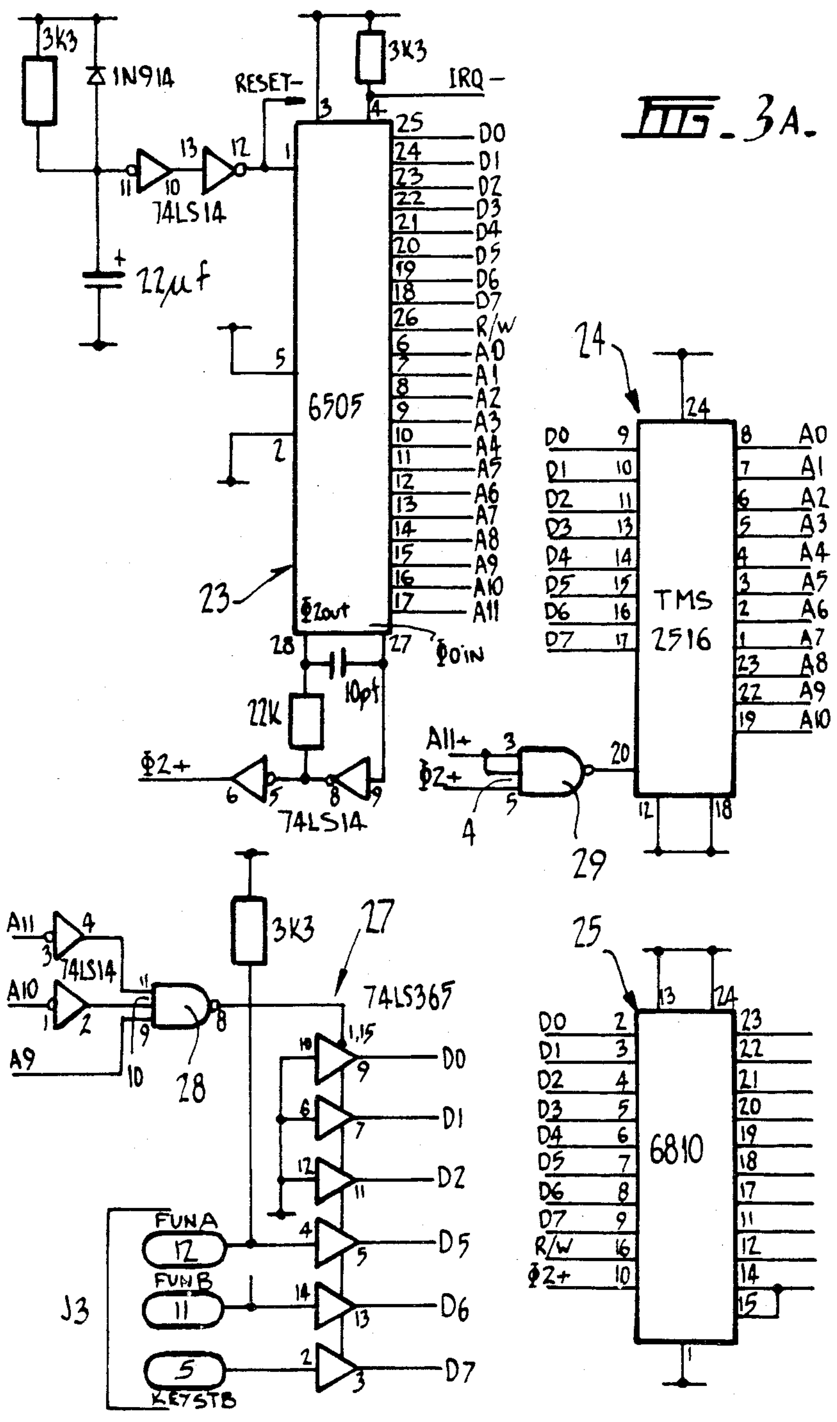
Figure 3B:
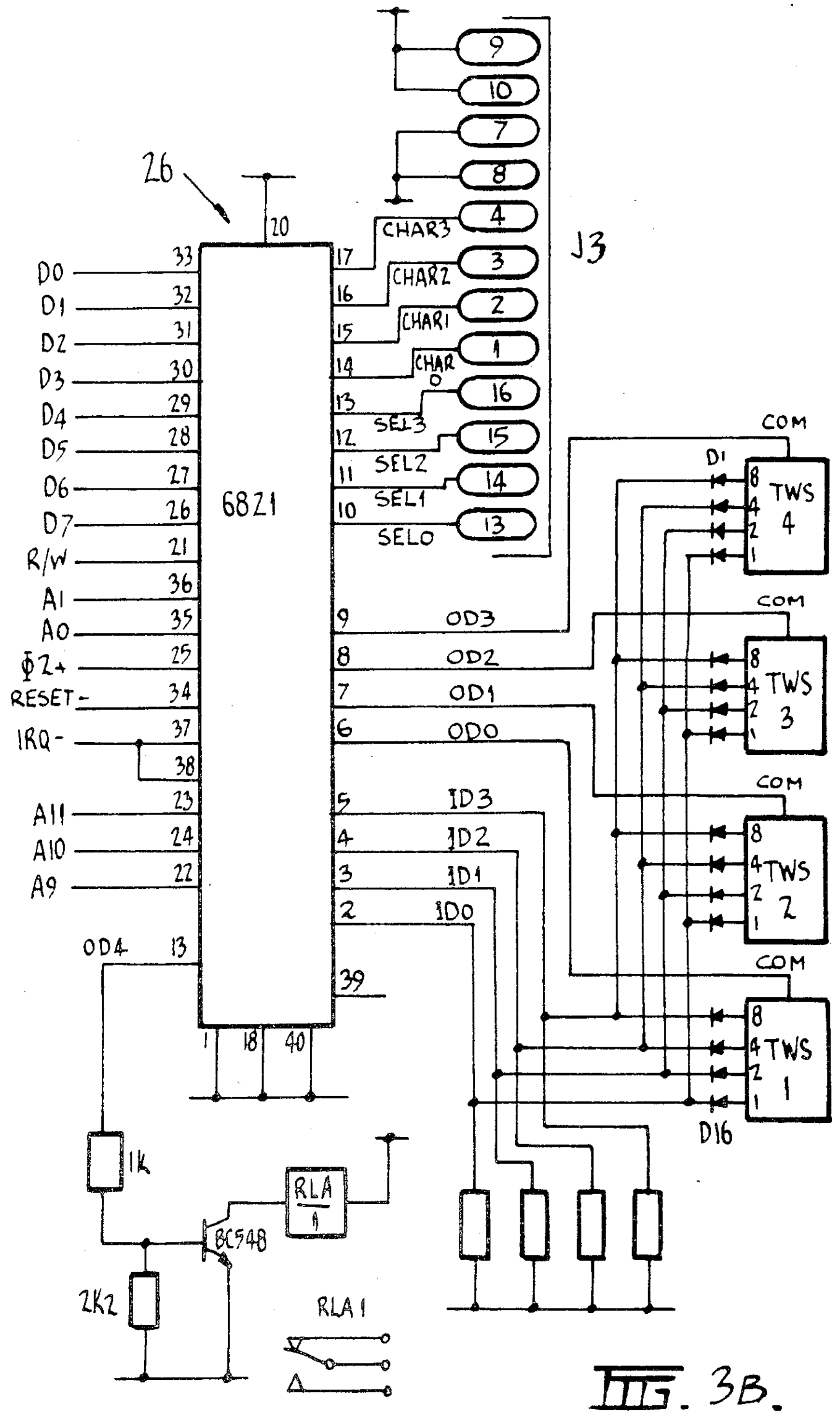
Figure 4:
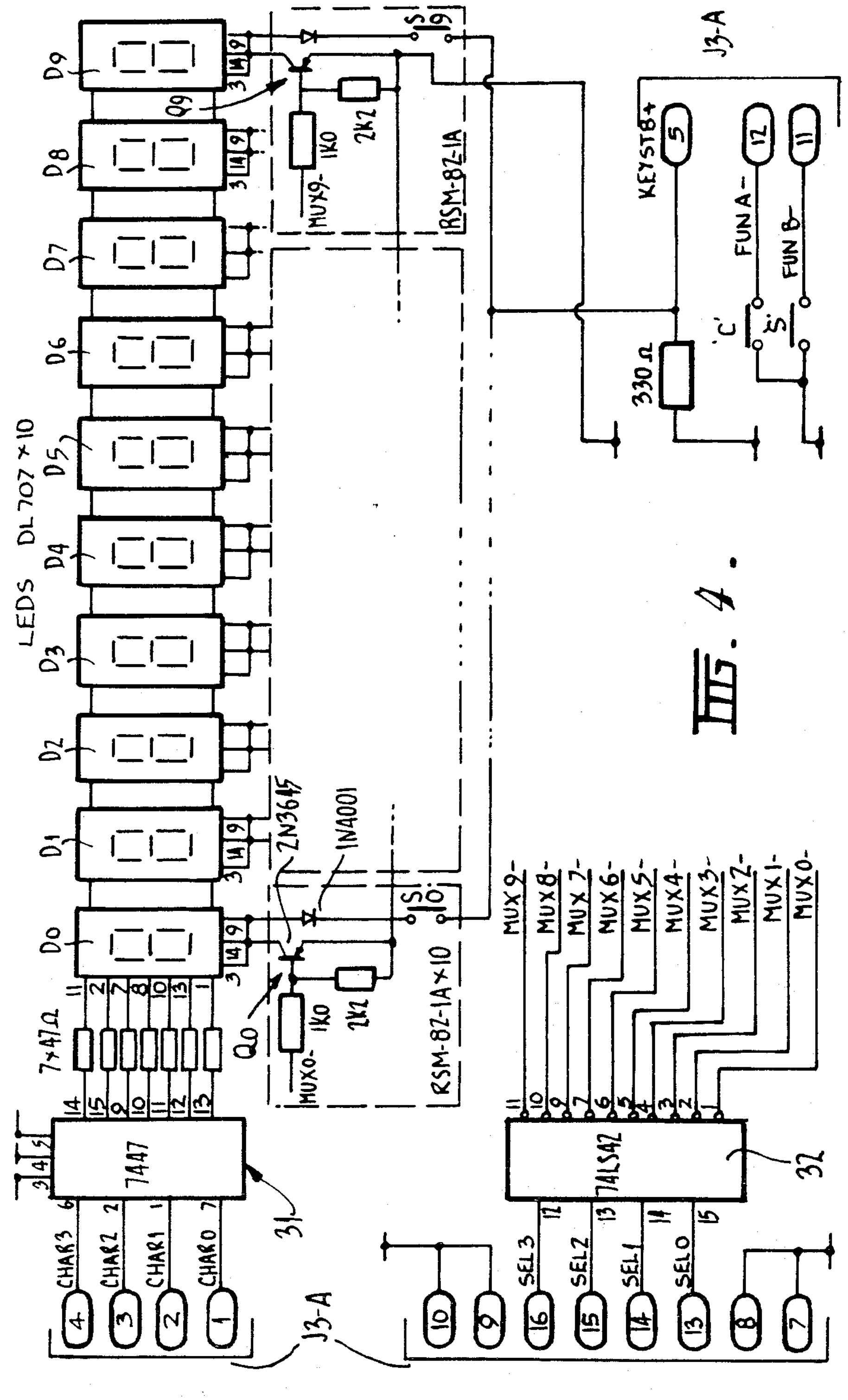

FIG. 3 shows the electrical circuit for the components mounted on board 14 and FIG. 4 shows the circuit for the components mounted on board 13. FIGS. 5 and 6 show the physical layout of the various components on the two boards. The circuits of the two boards are interconnected at J3 by a flat cable assembly.

The microprocessor may be a standard 8-bit type 6505 microprocessor and in FIGS. 3 and 5 it is designated as 23. This microprocessor performs a programme set in a 2516 EPROM designated as 24 and a 128×8 RAM designated as 25 provides the working memory for the microprocessor. A type 6321 parallel interface designated as 26 serves as a programmable input/output port and the functions of its input/output lines are set by the microprocessor.

A series of four binary coded decimal thumbwheel switches TWS1 to TWS4 are bussed into the input lines of buffer 26 for the purpose of initially setting a valid four digit code number.

Circuit board 14 also carries the relay RLA1 to provide the external access signal, a type 74LS36S three-state buffer designated as 27 and two AND gates 28, 29 (in the one unit) which serve to decode inputs from the microprocessor to buffer 27 and EPROM 24 respectively.

FIG. 4 illustrates a standard circuit for multiplexing ten displays having seven segments each. A type 7447 BCD to 7 segment decoder designated as 31 selects the segments while a type 74LS42 BCD to 10 line decoder designated as 32 selects the digit for display. The keyboard switches $S_0$ to $S_9$ use the same multiplexing action caused by component 32 successively switching transistors $Q_0$ to $Q_9$. If any one of key switches $S_0$ to $S_9$ is actuated, the line KEYSTRB+ (keystrobe+) is taken high at a time when the corresponding one of transistors $Q_0$ to $Q_9$ is switched on. If at this time the three-state buffer 27 is switched on by AND gate 28 the data line D7 will be seen by the microprocessor as being high and can act on that information accordingly.

Figure 7A:
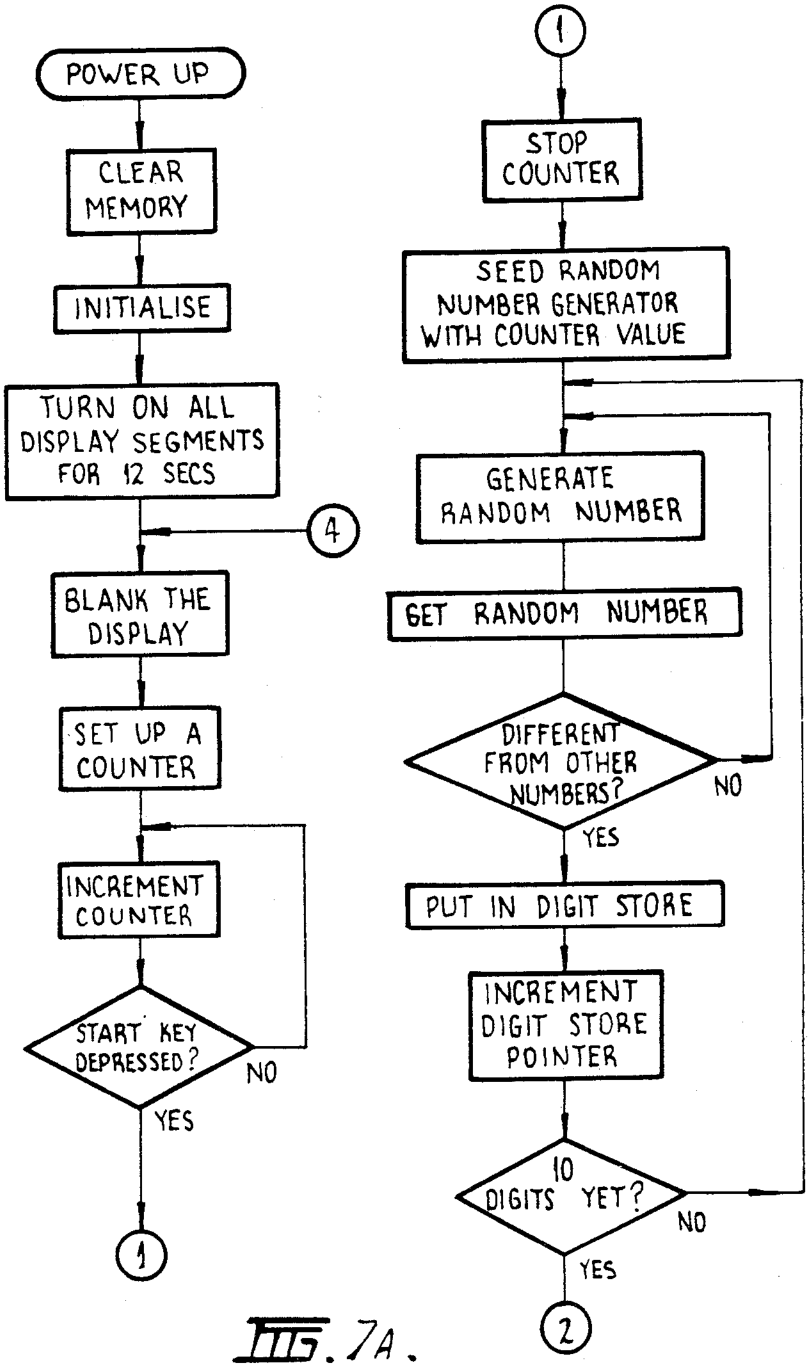
Figure 7B:
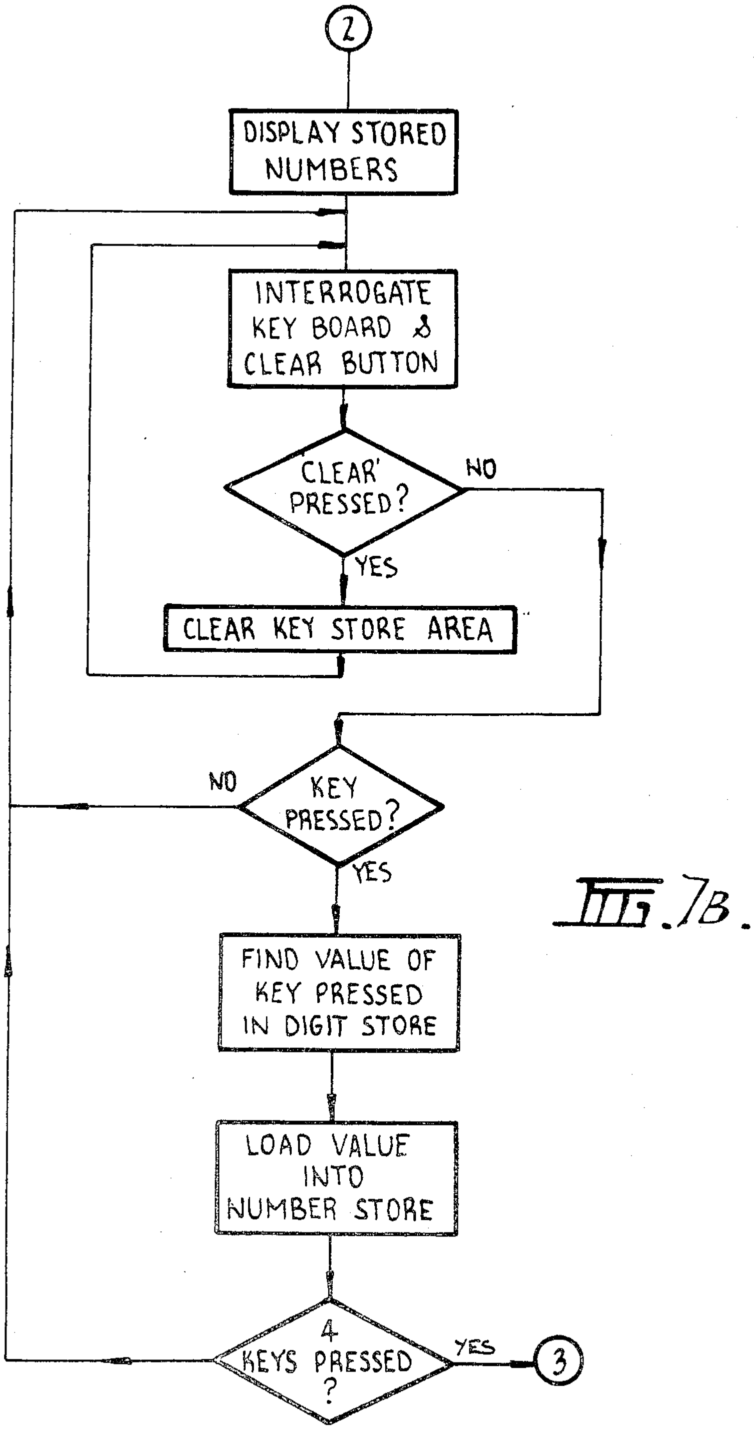
Figure 7C:
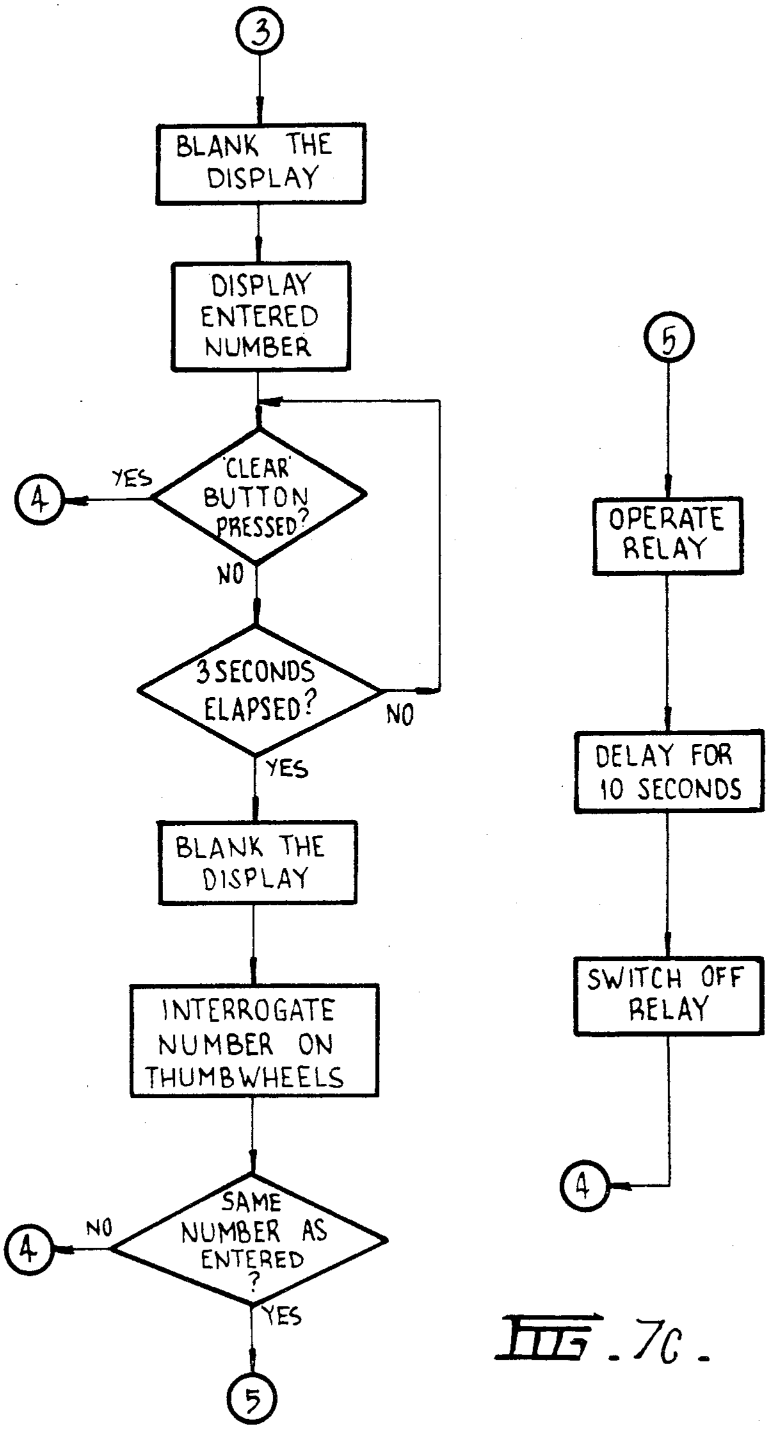

The operational sequence of the circuit is illustrated by the flow sheet in FIG. 7. After power is switched on the microprocessor executes a preliminary clearing and checking routine and then starts operation of a high speed counter which continues to run at about 0.5 megahertz until the start key "S" is depressed.

When the start key "S" is depressed the counter is stopped and the number then in the counter is used to seed the random number generator routine incorporated in the microprocessor programme in EPROM 24. The random number generator generates a first random digit which is transferred to a digit store within the working member 25. Successive digits are taken from the random number generator and, after rejection of any duplicated digits, these are stored at successive locations in the digit store to build up a random sequence of the ten digits 0 to 9.

When the random sequence of ten digits has been stored in memory 25, the microprocessor operates to display these in displays $D_0$ to $D_9$ through the multiplexing circuitry of FIG. 4. As previously explained the multiplexing circuitry acts successively to switch transistors $Q_0$ to $Q_9$ at the time that digits appear in the corresponding displays $D_0$ to $D_9$.

The microprocessor then watches for any actuation of one of the keyboard switches $S_0$ to $S_9$ or the clear switch "C". Actuation of one of the key switches is detected by a change in the condition of line KEYSTRB+ and the microprocessor determines the number being displayed from the digit store in the appropriate numeric display at that time. That digit is loaded into a number store also incorporated in the memory 25. This sequence of operation continues until four key switches have been actuated to assemble a four digit number in the number store. If at any time during this sequence of operations the clear button "C" is pressed the microprocessor operates to clear the number stored to enable operation of the keyboard to restart without changing the random sequence of digits displayed.

When a four digit number has been assembled in the number store, the microprocessor operates to blank the displays $D_0$ to $D_9$ and then display the stored number using four of those displays. The number is thus displayed for three seconds. If the clear button "C" is actuated during this short time interval, the microprocessor restarts the whole sequence of operation.

Provided that button "C" is not pressed within the three second time interval, the microprocessor operates to blank out the display and then to interrogate the thumbwheel switches TWS1 to TWS4 to determine the code number set on these switches. The outputs of each bit of the switches are isolated from one another by diodes and the common terminals of the switches are connected to the output lines OD0 to OD3. The output linen are normally held low by the programme running in the microprocessor except when it is required to interrogate the values set up on the switches. At this time the programme causes the lines OD0 to OD3 to go high in succession while at the same time reading the value from the particular switch whose common has been caused to go high. For example, if OD0 goes high the binary value of the digit set up on TWS1 is caused to be applied to ID0 to ID3 and this value is stored in memory 25 OD0 then goes low and OD1 goes high and so on until all four switches have been interrogated. In this way the code number set up on the thumbwheel switches is assembled in the memory 25. If this number is the same as the number generated by the keyboard and assembled in the number store, relay RLA1 is actuated and after ten seconds is switched off whereupon the microprocessor reverts to the start of its operating sequence. If the number generated by the keyboard is not the same as the number set by the thumbwheel switches the microprocessor reverts directly to the start of its operating routine and the relay is not actuated.

The illustrated apparatus has been advanced by way of example only and it could be modified considerably. For example, although this apparatus incorporates thumbwheel switches for setting up a valid four digit code it would be quite possible to load valid codes directly into the EPROM 24. In fact this alternative would provide much more flexibility in more sophisticated systems. For example, the programme could require separate entry of successive sequences of numbers generated by the keyboard and it would also be possible to use an alpha-numeric system.

The keyboard could be used in association with a device for reading a magnetically coded key or card, in which case the valid code number for comparison with the keyboard number may be determined by the magnetic coding of the key or card and may change according to the particular key or card used. The number comparison could be carried out in a control processing unit disposed at a location remote from the keyboard in which case the keyboard would merely provide an output indicative of the number generated by operation of the keys.

In the illustrated embodiment the key designations are scrambled when a start button is pressed immediately prior to operation of the keyboard, but other arrangements are quite possible. For example, the key designations could be scrambled after actuation of each key or in response to actuation of a predetermined number of keys or on actuation of an "Enter" key after completion of a sequence of key operations.

Although, the illustrated embodiment of the invention makes use of a microprocessor and employs software to achieve key designation and scrambling it would also be possible to provide hard-wired circuitry for these purposes.

It is accordingly to be understood that the invention is in no way limited to the details of the illustrated embodiment and that many modifications and variations will fall within the scope of the appended claims.

INDUSTRIAL APPLICABILITY

Apparatus according to the invention may be incorporated in any security system for controlling physical access to a security area or for controlling access to data storage equipment and/or information stored in such equipment.

What is claimed is:

1. Security apparatus comprising:

a keyboard having an array of selectively actuable keys;

a key value designation means for designating a value for each of the keys, said designation means including means for randomly scrambling the designated value of said keys;

a key value display means for displaying the designated values of the keys when said values are designated;

register means, operable for each key actuation, to register the designated value of a key at the time of its actuation.

2. The security apparatus as claimed in claim 1, wherein the key value display means comprises a plurality of illuminating display units, allotted one to each of said keys, for displaying an indicia representative of the value designated to each key by the key value designation means.

3. The security apparatus as claimed in claim 2, wherein the display units comprise light emitting diodes.

4. The security apparatus of claim 2, wherein said display units comprise liquid crystal displays.

5. A security apparatus as claimed in claim 2 or 3, or claim 4, wherein the keys comprise pushbuttons.

6. A security apparatus as claimed in claim 2 wherein each display unit is located adjacent a corresponding key.

7. A security apparatus as claimed in claim 1, wherein the random scrambling means is operative to generate and store a random sequence of unique values equal in number to the number of keys; and wherein the key value display means is operative to display said sequence of unique values whereby successive values in the sequence are visually associated with successive keys in the array of keys.

8. The security apparatus as claimed in claim 7, wherein there are ten keys in said array and said unique values correspond to the numerals 0 to 9.

9. The security apparatus as claimed in claim 1 or 7 and further comprising a comparator means for comparing a sequence of values registered by the register means upon sequential actuation of a number of said keys with a sequence of values representing a preselected code, and an output means, responsive to said comparator, for providing an indication of whether said sequence of values corresponds to said preselected code.

10. The security apparatus of claim 1 or 8 further comprising an additional key, wherein the random scrambling means is operative to scramble the designation of key values in response to actuation of said additional key.

11. The security apparatus as claimed in claim 10, wherein the key value designation means is inoperative until the additional key is actuated.

12. A security device comprising:

a keyboard comprising an array of selectively actuable keys;

a random number generator for generating a random number;

a memory storage for storing successive digits of the random number as a random sequence in an array corresponding to the array of the keys;

display means for displaying a value of each of the digits in a corresponding location of the array;

a multiplexing circuit operable to transfer the random sequence to the display means from the memory storage;

a code storage memory for storing at least one access validation code; and a microprocessor for controlling the operation of the security device, said microprocessor being operable to scan the keys and detect a location of a key in said array which is actuated during entry of an access code, and to interrogate the multiplexing circuit, and to compare, for each entry, said location with said digits and to enter values of the digits corresponding to said locations into the memory storage, and to compare the entered access code in the memory storage with a validation code in the code storage memory to determine if said entered access code and validation code correspond.

* * * * *